No. 854,540. PATENTED MAY 21, 1907.
C. H. SPRAY.
SAW CLAMP.
APPLICATION FILED MAR. 11, 1907.
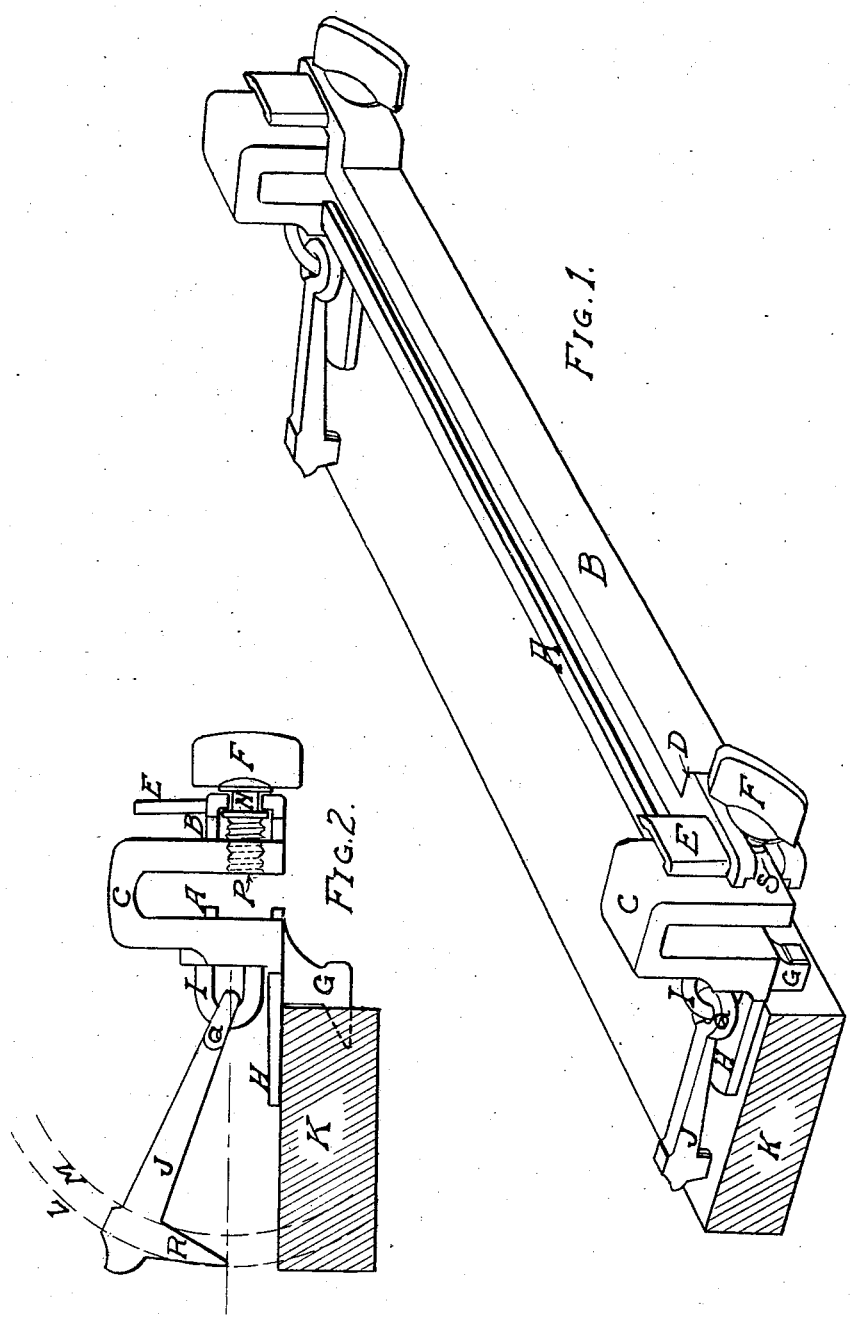

UNITED STATES PATENT OFFICE.

CHARLES HENRY SPRAY, OF INDIANAPOLIS, INDIANA.

SAW-CLAMP.

No. 854,540.  Specification of Letters Patent.  Patented May 21, 1907.

Application filed March 11, 1907. Serial No. 361,721.

*To all whom it may concern:*

Be it known that I, CHARLES HENRY SPRAY, a citizen of the United States, residing at Indianapolis, in the county of Marion and State of Indiana, have invented a new and useful Saw-Clamp, of which the following is a specification.

My invention relates to improvements in saw clamps, which are used in jointing, setting and filing saws, and are fastened to a workman's bench or other place of support while using the same, and the objects of my improvement are, first, to provide a clamp for holding a saw in the several positions required, without the need of spanning the full width of saw blade, thus saving the needed strength while the clamp may be made very light; second, to provide a means of fastening the clamp to, or releasing same from a workman's bench or other support easily and quickly, without the necessity of nails or screws. I attain these objects by the mechanism illustrated in the accompanying drawing, in which Figure 1 is a perspective view of the entire clamp, while Fig. 2 is an end view.

The bar A is provided with an integral arch C with screw threaded hole P, a foot H, a lug hook G and an eyelet I at each end thereof and having attached to each end of said bar, a dog J, these dogs being provided at one end of their stems with an eyelet Q and at their opposite end with a fang R. Said fangs are made at about a right angle to the main stem of the dogs. These eyelets Q in the dogs J, are to engage in the eyelets I on bar A to form a universal or link joint between each dog and said bar.

The bar B, is formed at each end into an elbow D, with a slotted hole S, and an upward projecting vise jaw E, all as integral parts of bar B. My object is that the two bars A and B may come into contact with each other, so that a saw may be entered between them from below and project above the bars to any extent not opposed by arches C, thus holding the saw in a position to be filed; and that the elbows D, forming part of bar B, may encompass the outer side of corresponding arches C, on bar A, so that I may attain a bearing of vise jaws E, against the outer side of arches C, on bar A. The outside of the arches thus form mating vise jaws, so that the inside of vise jaws E, shall come into contact with the outside of arches C, to form a vise head at each end of the clamp. By this means the saw may be entered from the top down between these two vise heads thus formed, and held in a position allowing the teeth to be accessible from heel to point of blade, for jointing and setting purposes. Thumb screws F, are provided, having screw threads to operate in screw threaded holes P, through one leg of arches C, on bar A. These thumb screws are also provided with a channel N, encircling the screw stem. The reduced diameter of the stem at this point caused by the channel, is of a size to snugly fit the slotted holes S, in elbows D, on bar B; and the full diameter of the screw stem outside of the track of the channel being greater than the diameter of the slotted hole, shoulders are thus formed against the inside and outside of the elbows. Thus when the thumb screws are turned and operate in the threaded holes P, in arches C, on bar A, and engaging the channeled part N of screw stems F in slotted holes S, in bar B, the two saw bars A and B are thereby connected and caused to approach or recede from each other. In the same manner the vise jaws E, on bar B, and the arches C on bar A, (which arches are utilized for corresponding vise jaws) are caused to approach or recede from each other by the same action of the thumb screws, thus forming a small vise head at each end of the clamp for holding the saw accessible from heel to point of blade for a jointing and setting position, the elbows being just deep enough that the bars A and B come into contact when the clamp is empty, at the same instant that the vise jaws E come into contact with the arches C, used as the mating jaws for the vise heads so formed.

By the means at each end of bar A, of a foot H, a lug hook G, and an eyelet I, to which eyelet is connected a dog J, by loose or universal joint, I attain the second object of my invention, namely, to fasten the clamp to a support.

Referring to Figs. 1 and 2, I wish to point out that in order to fasten the clamp to a bench K, the feet H rest on top of the bench, as far back as the lug hooks G will permit, said lug hooks (pointing inward to the upright face of the bench) are then hammered in until firmly seated, carrying the entire clamp with them through a horizontal track or plane, the dogs J being thrown back out of the way. As will be seen, the fangs R would be in the way for driving the lug hooks G to their seat in the plane required, if there were no joints between the dogs and the clamp. Thus one object of the joint will be seen. After this part of fastening the clamp so far described has been accomplished, the dogs J are brought into play. It will be seen in Fig. 2 that when the point of fang R (traveling in an arc allowed by the universal joint) is in a horizontal plane with the center of the joint, the dog has then its longest overreaching position; and, as the dog is caused to move downward below the horizontal line mentioned and the fang is sunk into the support, its overreaching capacity is lessened. And thus the deeper down the fang is driven into the support the more firmly the clamp is drawn and held to the bench; and furthermore, additional tension capacity may be provided for the dogs by varying the angle that the fang is made to the main stem of dog. As will be seen, when the fang of the dog, traveling in an arc by means of the universal joint, the point of the fang travels in the arc L; while the upper inside end or shoulder of the fang travels in the arc line M, so that the lower end of the fang has greater overreaching capacity than its upper end. Thus the deeper the fang is sunk into the support the more tension it applies to the clamp. It will be seen that if the fangs were made at a different angle to the main stem of the dogs from what they are shown here, the distance between arc lines L and M would be so increased or decreased, and the tendency of the clamp to give over to the tension so applied, is opposed by feet H forming braces against this tendency, thus preventing the clamp from being drawn over on top of the support in a rolling position, and preventing lug hooks G from disengaging themselves.

I am aware that other saw clamps have been made where the saw is entered between the saw bars from below, exposing the teeth above the saw bars for a filing position only, and others for a filing or jointing and setting position, by entering the saw from the top and spanning full width of blade, and using various ways of fastening the clamp to a support. I do not therefore claim broadly such a combination, but

I claim—

1. The combination in a saw clamp, of a saw bar A provided with an integral arch C at each end thereof, a bar B provided with an integral elbow D at each end thereof, the latter being arranged to encompass the arches on the bar A, and means for moving the bar B toward the bar A to clamp the saw.

2. The combination in a saw clamp of a saw bar A provided with an integral arch and vise jaw C at each end thereof, a bar B provided with an integral elbow D, and upward projecting vise jaw E at each end thereof, and means for moving the vise jaws E on bar B toward their corresponding arch and vise jaws C on bar A to clamp the saw.

3. The combination in a saw clamp of a bar A provided with an integral arch and vise jaw C at each end thereof, a bar B provided with an integral elbow D and upward projecting vise jaw E at each end thereof, and having a thumb screw F provided at each end of the clamp, as a means of connecting the bar B to bar A, and to move the former toward the latter to clamp the saw for a filing position, and by the same means to move the vise jaws E on bar B toward their corresponding vise jaws C on bar A to clamp the saw for a jointing position.

4. The combination in a saw clamp of a bar A and B and means of connecting one with the other, the bar A being provided with an integral foot H, a lug hook G and an eyelet I at each end thereof and having attached to each end of the bar A, by universal or link joint, a dog J for the purposes specified.

CHARLES HENRY SPRAY.

Witnesses:
    DAVIS H. IRVIN,
    WILLIAM EDWIN BOOTES.